US 12,382,158 B2

United States Patent
Wang et al.

(10) Patent No.: US 12,382,158 B2
(45) Date of Patent: Aug. 5, 2025

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Che-Wei Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 782 days.

(21) Appl. No.: 17/502,521

(22) Filed: Oct. 15, 2021

(65) Prior Publication Data

US 2022/0120997 A1    Apr. 21, 2022

Related U.S. Application Data

(60) Provisional application No. 63/092,342, filed on Oct. 15, 2020.

(51) Int. Cl.
| | |
|---|---|
| *H04N 23/57* | (2023.01) |
| *G02B 7/00* | (2021.01) |
| *G02B 26/04* | (2006.01) |
| *H04N 23/55* | (2023.01) |

(52) U.S. Cl.
CPC ............ *H04N 23/57* (2023.01); *G02B 7/005* (2013.01); *G02B 26/04* (2013.01); *H04N 23/55* (2023.01)

(58) Field of Classification Search
CPC .............................. H04N 23/55; G03B 11/043
See application file for complete search history.

(56) References Cited

U.S. PATENT DOCUMENTS

| | | | | |
|---|---|---|---|---|
| 11,082,594 B2 * | 8/2021 | Imai | ..... | G06F 21/31 |
| 11,226,466 B2 * | 1/2022 | Wang | ..... | G02B 26/02 |
| 11,256,159 B2 * | 2/2022 | Clark | ..... | G03B 29/00 |
| 11,714,332 B2 * | 8/2023 | Wang | ..... | G03B 11/043 |
| | | | | 359/813 |
| 2020/0218130 A1 * | 7/2020 | Nakamura | ..... | G03B 11/043 |

FOREIGN PATENT DOCUMENTS

| | | | | |
|---|---|---|---|---|
| CN | 109451280 A | * | 3/2019 | ..... H01H 9/20 |
| CN | 208754604 U | * | 4/2019 | ..... H04N 23/51 |
| CN | 209134547 U | * | 7/2019 | ..... H01H 9/20 |
| KR | 10-2010-0055592 A | | 5/2010 | |

OTHER PUBLICATIONS

Office Action (with Search Report) issued in corresponding CN application No. 2025051901550760 dated May 19, 2025 (4 pages).

\* cited by examiner

*Primary Examiner* — Christopher Stanford
(74) *Attorney, Agent, or Firm* — MUNCY, GEISSLER, OLDS & LOWE, P.C.

(57) ABSTRACT

The present disclosure provides an optical element driving mechanism, which includes a first movable part, a fixed assembly, a first driving assembly and a locking assembly. The first movable part includes an optical element. The fixed assembly has a first opening, and the first movable part is movable relative to the fixed assembly. The first driving assembly is configured to drive the first movable part to move relative to the fixed assembly, so that the optical element selectively overlaps the first opening. The locking assembly is configured to fix the first movable part at a first position relative to the fixed assembly temporarily.

20 Claims, 11 Drawing Sheets

OPTICAL ELEMENT DRIVING MECHANISM

CROSS REFERENCE TO RELATED APPLICATIONS

This application claims the benefit of U.S. Provisional Application No. 63/092,342, filed on Oct. 15, 2020, the entirety of which is incorporated by reference herein.

BACKGROUND OF THE DISCLOSURE

Field of the Disclosure

The present disclosure relates to an optical element driving mechanism, and in particular it relates to an optical element driving mechanism with a shutter structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a first movable part, a fixed assembly, a first driving assembly and a locking assembly. The first movable part includes an optical element. The fixed assembly has a first opening, and the first movable part is movable relative to the fixed assembly. The first driving assembly is configured to drive the first movable part to move relative to the fixed assembly, so that the optical element selectively overlaps the first opening. The locking assembly is configured to fix the first movable part at a first position relative to the fixed assembly temporarily.

According to some embodiments, the optical element driving mechanism further includes: a second movable part, movable relative to the fixed assembly and the first movable part; a second driving assembly, configured to drive the second movable part to move relative to the fixed assembly; and a pressing element, configured to generate a first pre-pressure on the second movable part. The second driving assembly is configured to drive the second movable part to move in a first direction relative to the fixed assembly. The second driving assembly is configured to drive the second movable part to move in a second direction relative to the fixed assembly. Both the first direction and the second direction are parallel to a first axis. The first direction and the second direction are opposite to each other. At least one of the first direction and the second direction is the same as a direction of the first pre-pressure.

According to some embodiments, the second driving assembly includes: a second coil; a second magnetic element, corresponding to the second coil; a second magnetically conductive element, corresponding to the second coil; and a guiding element, configured to guide the movement of the second movable part relative to the fixed assembly. The guiding element having a long strip-shaped structure extends along the first axis. The second magnetically conductive element has a plate-shaped structure. The second magnetically conductive element is perpendicular to a second axis. The first axis is perpendicular to the second axis.

According to some embodiments, the fixed assembly has a second accommodation space configured to accommodate the second driving assembly. The second accommodation space has a second slot extending in a third direction. When viewed along the second axis, the second magnetically conductive element with a long strip-shaped structure extends along the first axis. The second coil surrounds the second magnetically conductive element.

According to some embodiments, when viewed along the second axis, the second coil overlaps at least a part of the second magnetic element. When viewed along a third axis, the second magnetic element overlaps at least a part of the pressing element. The third axis is perpendicular to the first axis and the second axis.

According to some embodiments, when viewed along the third axis, the second coil overlaps at least a part of the pressing element. When viewed along the third axis, the second magnetically conductive element does not overlap the pressing element. The pressing element surrounds the guiding element. The pressing element has a spiral structure. The pressing element has a metal material. The pressing element has flexibility.

According to some embodiments, the optical element driving mechanism further includes a restricting assembly configured to restrict the second movable part from rotating around the first axis relative to the fixed assembly. The restricting assembly includes a first limiting surface and a second limiting surface located on the fixed assembly and facing opposite directions.

According to some embodiments, when viewed along the second direction, the first limiting surface and the second limiting surface are respectively located on two sides of the second movable part. Both the first limiting surface and the second limiting surface are perpendicular to the third axis.

According to some embodiments, the locking assembly further includes a first locking part, corresponding to the second movable part and configured to temporarily fix the first movable part at the first position. The first locking part includes: a first stopping surface, located on the first movable part; and a second stopping surface, located on the second movable part and corresponding to the first stopping surface. The first driving assembly is configured to drive the first movable part to move along the third axis. The first stopping surface is neither parallel nor perpendicular to the third axis. The second stopping surface is neither parallel nor perpendicular to the third axis.

According to some embodiments, the first stopping surface is parallel to the second stopping surface. The first stopping surface and the second stopping surface face opposite directions. The first stopping surface and the second stopping surface are configured to contact each other to limit the movement of the first movable part relative to the fixed assembly. When the first stopping surface is in contact with the second stopping surface, two ends of the first movable part with a long strip-shaped structure are not in direct contact with the fixed assembly.

According to some embodiments, the first locking part further includes: a third stopping surface, located on the first movable part; and a fourth stopping surface, located on the second movable part and corresponding to the third stopping surface. The fourth stopping surface is not parallel to the second stopping surface. The fourth stopping surface is neither parallel nor perpendicular to the third axis. The fourth stopping surface is not parallel to the third stopping surface.

According to some embodiments, the third stopping surface and the fourth stopping surface are configured to contact each other to limit the movement of the first movable part relative to the fixed assembly. In the first axis, a maximum size of the first stopping surface is smaller than a maximum size of the third stopping surface. When the third stopping surface is in contact with the fourth stopping surface, the two ends of the first movable part are not in direct contact with the fixed assembly.

According to some embodiments, the locking assembly further includes: a second locking part, corresponding to the second movable part and configured to temporarily fix the first movable part at a second position. The second locking part includes: a fifth stopping surface, located on the first movable part and corresponding to the fourth stopping surface; and a sixth stopping surface, located on the first movable part. The fifth stopping surface is neither parallel nor perpendicular to the third axis.

According to some embodiments, the fifth stopping surface is parallel to the fourth stopping surface. The fifth stopping surface and the fourth stopping surface face opposite directions. The fifth stopping surface and the fourth stopping surface are configured to contact each other to limit the movement of the first movable part relative to the fixed assembly. When the fifth stopping surface is in contact with the fourth stopping surface, the two ends of the first movable part with the long strip-shaped structure are not in direct contact with the fixed assembly.

According to some embodiments, the sixth stopping surface is not parallel to the second stopping surface. The sixth stopping surface and the second stopping surface are configured to contact each other to limit the movement of the first movable part relative to the fixed assembly. In the first axis, a maximum size of the fifth stopping surface is smaller than a maximum size of the sixth stopping surface. In the first axis, the maximum size of the fifth stopping surface is the same as the maximum size of the first stopping surface. In the first axis, a maximum size of the sixth stopping surface is the same as the maximum size of the third stopping surface.

According to some embodiments, when the sixth stopping surface is in contact with the second stopping surface, the two ends of the first movable part are not in direct contact with the fixed assembly. The locking assembly further includes a connecting surface, located on the first movable part and perpendicular to the first axis. The connecting surface is connected to the first stopping surface and the fifth stopping surface.

According to some embodiments, when the second movable part is located at the first position relative to the fixed assembly, and when viewed along the third axis, the connecting surface overlaps at least a part of the second movable part. When the second movable part is located at the first position relative to the fixed assembly, and when viewed along the third axis, the connecting surface overlaps at least a part of the second stopping surface.

According to some embodiments, the first driving assembly includes: a first coil; a first magnetic element, corresponding to the first coil; and a first magnetically conductive element, corresponding to the first coil. The first magnetically conductive element has a plate-shaped structure. The first coil surrounds the first magnetically conductive element. The first magnetically conductive element is perpendicular to a second axis.

According to some embodiments, the fixed assembly has a first accommodation space configured to accommodate the first driving assembly. The fixed assembly further has a guiding structure configured to guide the movement of the first movable part relative to the fixed assembly. The first accommodation space has a first slot extending in the third direction. When viewed along the second axis, the first magnetically conductive element with a long strip-shaped structure extends along the third axis. When viewed along the second axis, the first coil overlaps at least a part of the first magnetic element.

According to some embodiments, when viewed along the third axis, the first coil overlaps at least a part of the second coil. When viewed along the third axis, the first coil overlaps at least a part of the second magnetic element. When viewed along the third axis, the first magnetic element overlaps at least a part of the second magnetic element. When viewed along the third axis, the first magnetic element and the second coil do not overlap. When viewed along the third axis, the first magnetic element overlaps at least a part of the pressing element. When viewed along the third axis, the first coil overlaps at least a part of the pressing element. When viewed along the third axis, the first magnetically conductive element does not overlap with the pressing element.

The present disclosure provides an optical element driving mechanism, including a first movable part, a fixed assembly, a first driving assembly and a locking assembly. The first movable part is movable relative to the fixed assembly. The first driving assembly is configured to drive the first movable part to move relative to the fixed assembly. The locking assembly is used to fix the first movable part at the first position or the second position relative to the fixed assembly.

In some embodiments, the locking assembly includes the locking element configured to be selectively engaged with the first engaging structure or the second engaging structure, thereby locking the optical element. Based on this structural design, the optical element can be firmly locked. When the optical element driving mechanism is impacted, it can effectively prevent the locking element from separating from the optical element.

In addition, the optical element driving mechanism can be miniaturized by a special space configuration. Furthermore, the fourth stopping surface on the locking element and the fifth stopping surface on the optical element can be parallel inclined planes to form an interlocking structure. Based on this special configuration, it can be ensured that when the optical element driving mechanism receives a strong impact, the first opening can continue to be shaded.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first". "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1:
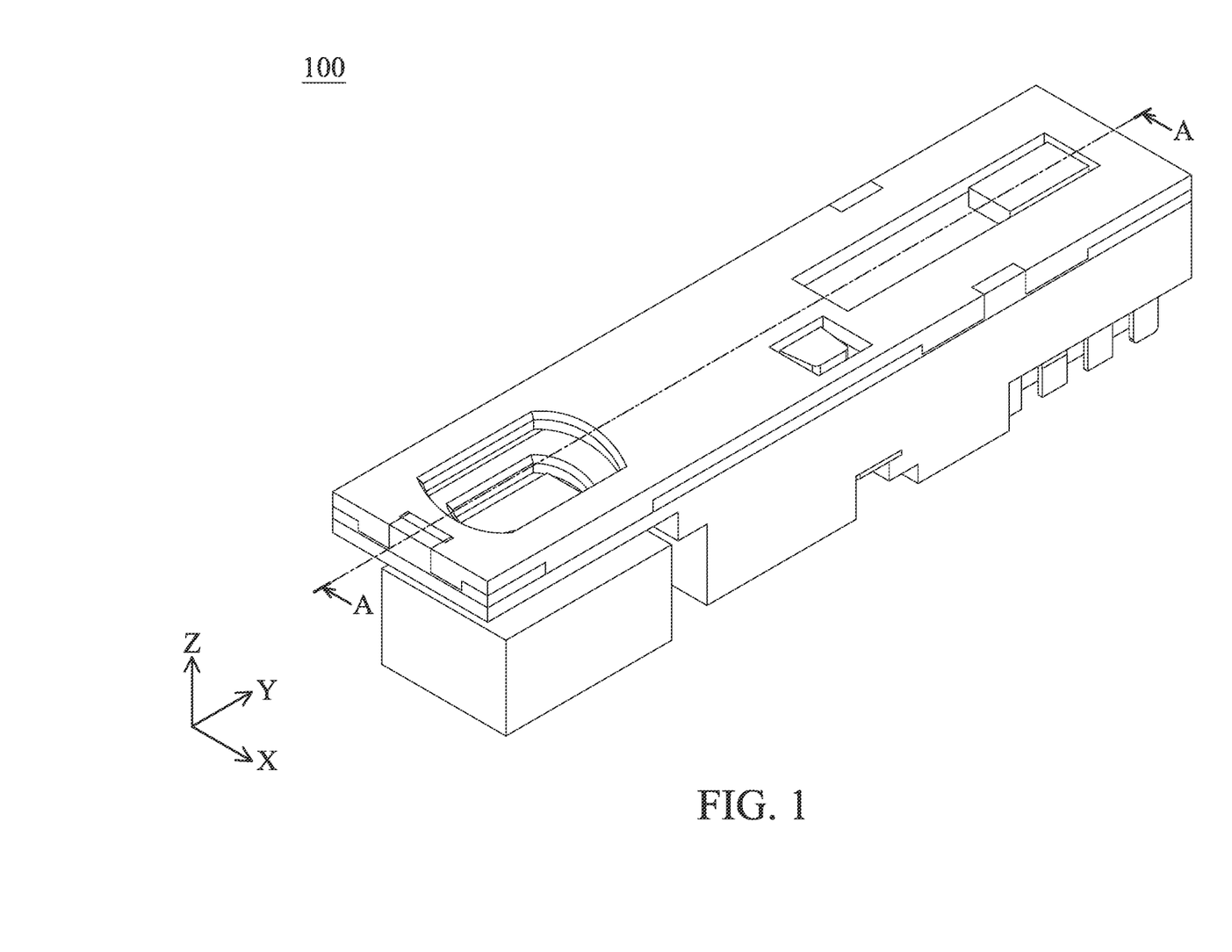
FIG. 1 shows a schematic diagram of an optical element driving mechanism 100 according to an embodiment of the present disclosure.
Figure 2:
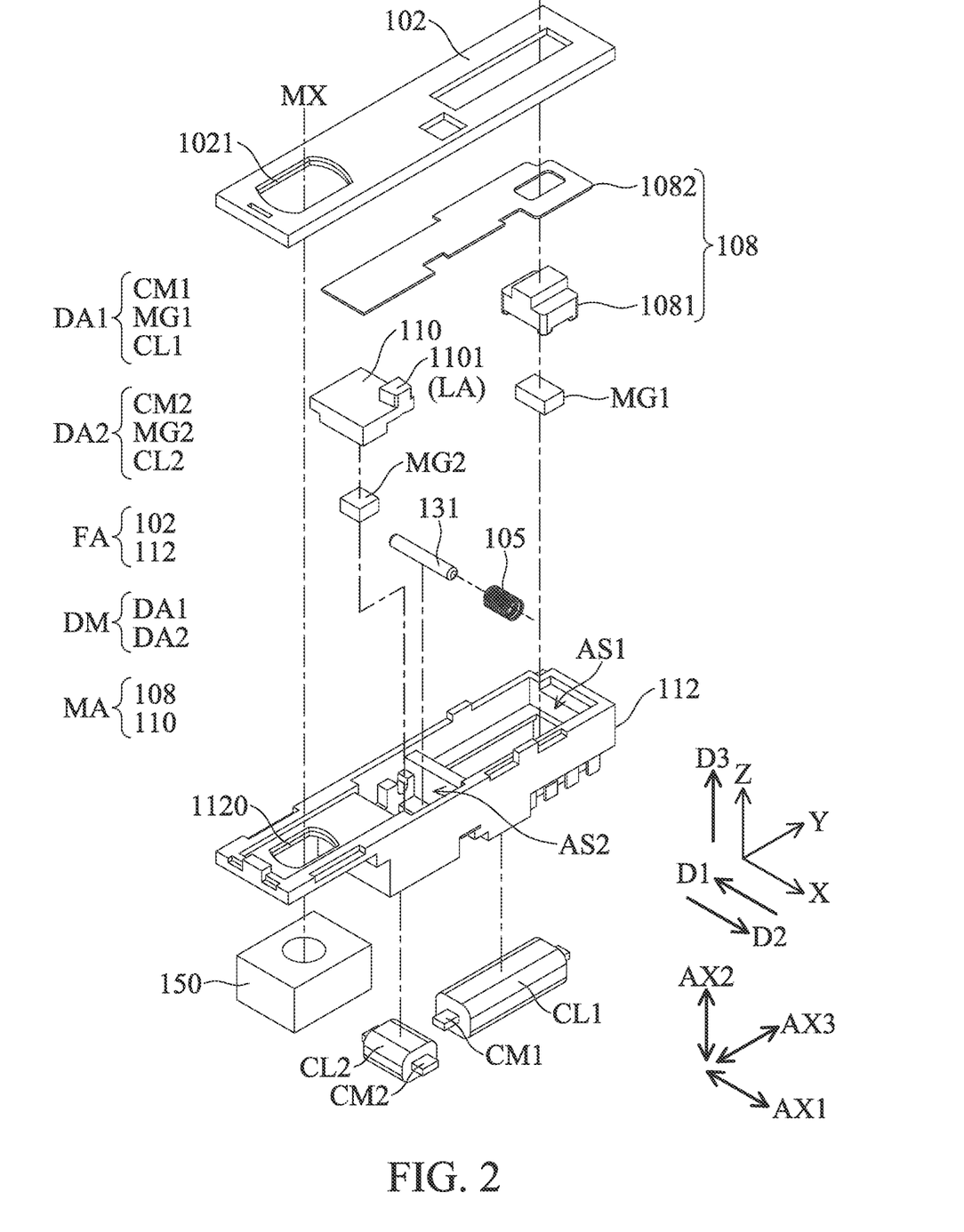
FIG. 2 shows an exploded diagram of the optical element driving mechanism 100 according to the embodiment of the present disclosure.
Figure 3:
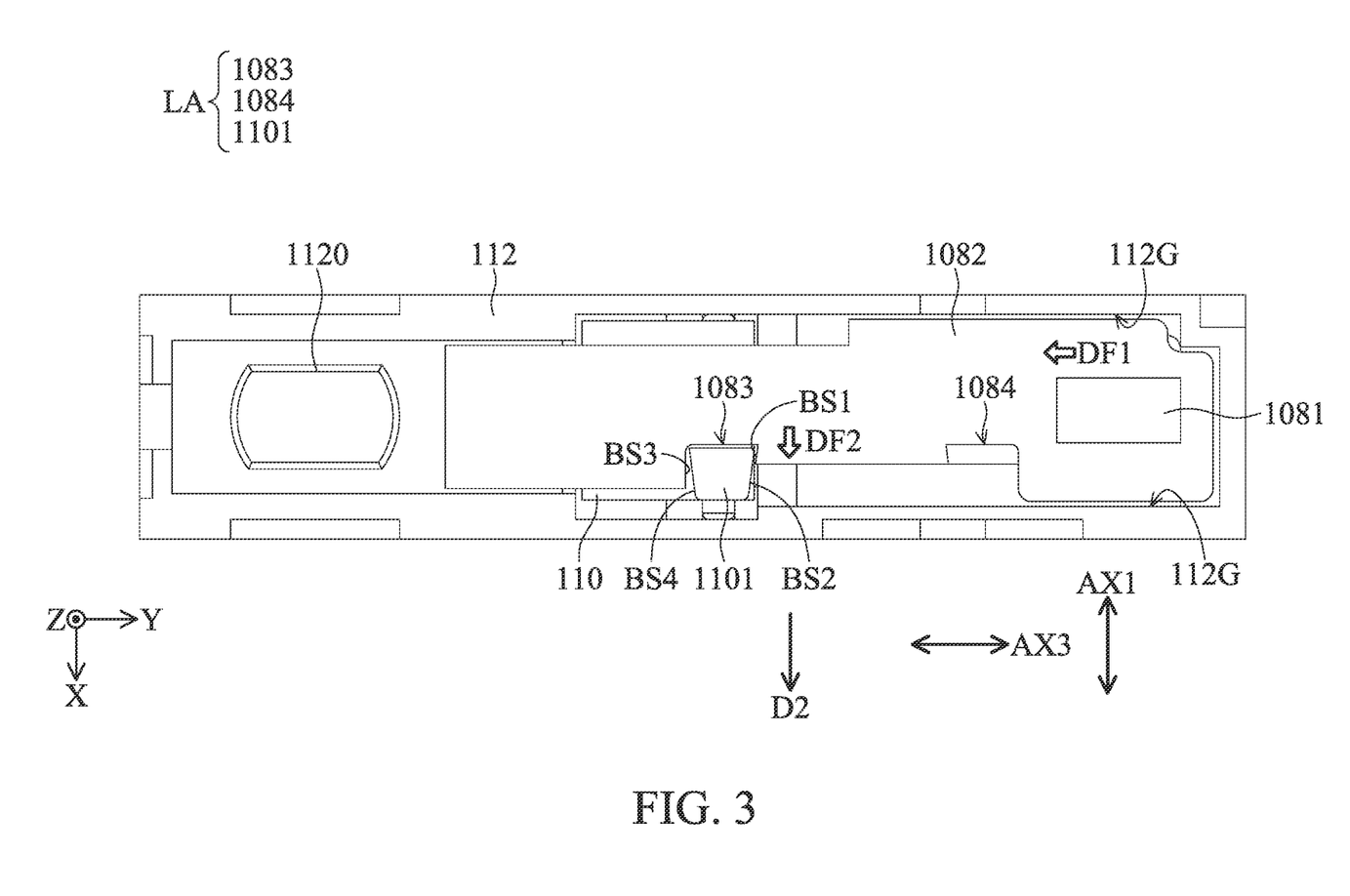
FIG. 3 shows a top view of a partial structure of the optical element driving mechanism 100 according to the embodiment of the present disclosure.

Please refer to FIG. 1 to FIG. 3. FIG. 1 shows a schematic diagram of an optical element driving mechanism 100 according to an embodiment of the present disclosure, FIG. 2 shows an exploded diagram of the optical element driving mechanism 100 according to the embodiment of the present disclosure, and FIG. 3 shows a top view of a partial structure of the optical element driving mechanism 100 according to the embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving module DM. The movable assembly MA is movably connected to the fixed assembly FA. The driving module DM is configured to drive the movable assembly MA to move relative to the fixed assembly FA.

In this embodiment, as shown in FIG. 2, the fixed assembly FA includes a covering body 102, and a base 112. The movable assembly MA may include a first movable part 108, and a second movable part 110. The first movable part 108 may include a holder 1081 and an optical element 1082. In this embodiment, the optical element 1082 can be used as a light-shielding film or a shutter, but it is not limited thereto. In other embodiments, the optical element 1082 can also be used as a filter or aperture, and so on.

In this embodiment, the holder 1081 is detachably connected to the optical element 1082, but it is not limited thereto. For example, in other embodiments, the optical element 1082 can be connected to the holder 1081 by insert molding technology. For example, the holder 1081 may be made of a non-metal material, such as a plastic material, and the optical element 1082 may be a metal material.

The covering body 10 is fixedly disposed on the base 112, the covering body 102 can be combined with the base 112 to cooperatively accommodate the movable assembly MA and the driving module DM, and the first movable part 108 is movable relative to the fixed assembly FA.

As shown in FIG. 2, the aforementioned covering body 102 has a first opening 1021, the base 112 has a second opening 1120, and the base 112 accommodates a photosensitive module 150 (the optical module). An external light can travel along a main axis MX, pass through the first opening 1021 and the second opening 1120, and then be received by the aforementioned photosensitive module 150 to generate a digital image signal.

In addition, the optical element driving mechanism 100 may further include a locking assembly LA. When the driving module DM does not drive the first movable part 108 to move relative to the fixed assembly FA, the locking assembly LA is configured to temporarily fix the first movable part 108 relative to the fixed assembly at a first position, such as the position shown in FIG. 3. The locking assembly LA may include a locking element 1101 and a first engaging structure 1083, and the locking element 1101 can be engaged with the first engaging structure 1083, so that the first movable part 108 is fixed at the first position relative to the fixed assembly FA.

In this embodiment, the driving module DM includes a first driving assembly DA1 for driving the first movable part 108 to move along the Y-axis relative to the fixed assembly FA, so that the optical element 1082 can selectively overlap the first opening 1021. For example, when the locking assembly LA does not lock the first movable part 108, the first movable part 108 can move along the Y-axis to shade the first opening 1021 and the second opening 1120.

The first driving assembly DA1 includes a first coil CL1, a first magnetically conductive element CM1, and a first magnetic element MG1. The first magnetic element MG1 corresponds to the first coil CL1, and the first magnetically conductive element CM1 corresponds to the first coil CL1. For example, the first coil CL1 surrounds the first magnetically conductive element CM1. The first magnetically conductive element CM1 has a plate-shaped structure, and the first magnetically conductive element CM1 is perpendicular to a second axis AX2. The second axis AX2 is parallel to the Z-axis.

The fixed assembly FA has a first accommodation space AS1 configured to accommodate the first driving assembly DA1. The fixed assembly FA further has a guiding structure 112G, such as a groove, configured to guide the movement of the first movable part 108 relative to the fixed assembly FA along the Y-axis.

Figure 4:
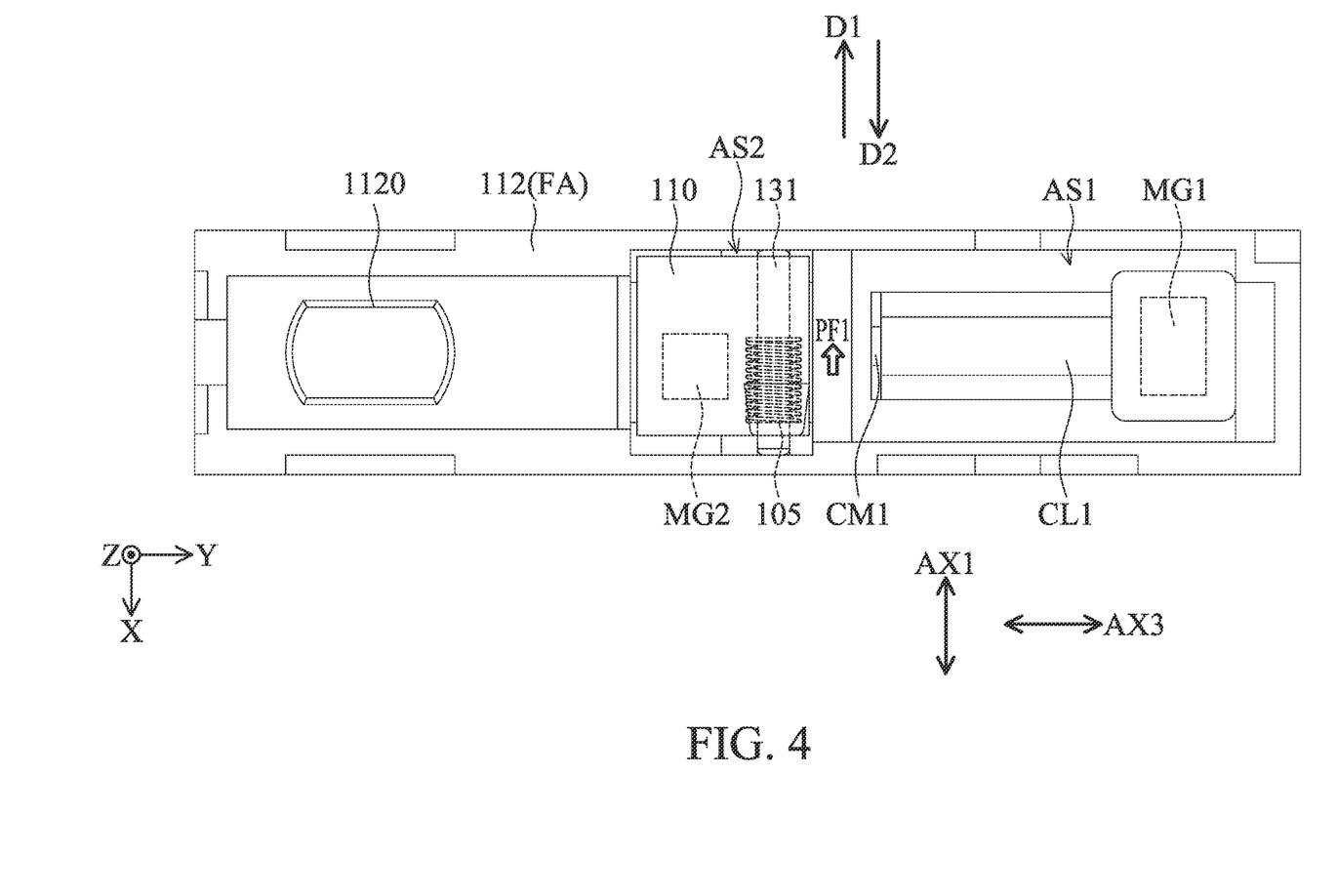
FIG. 4 is a top view of a partial structure of the optical element driving mechanism 100 according to an embodiment of the present disclosure.
Figure 5:
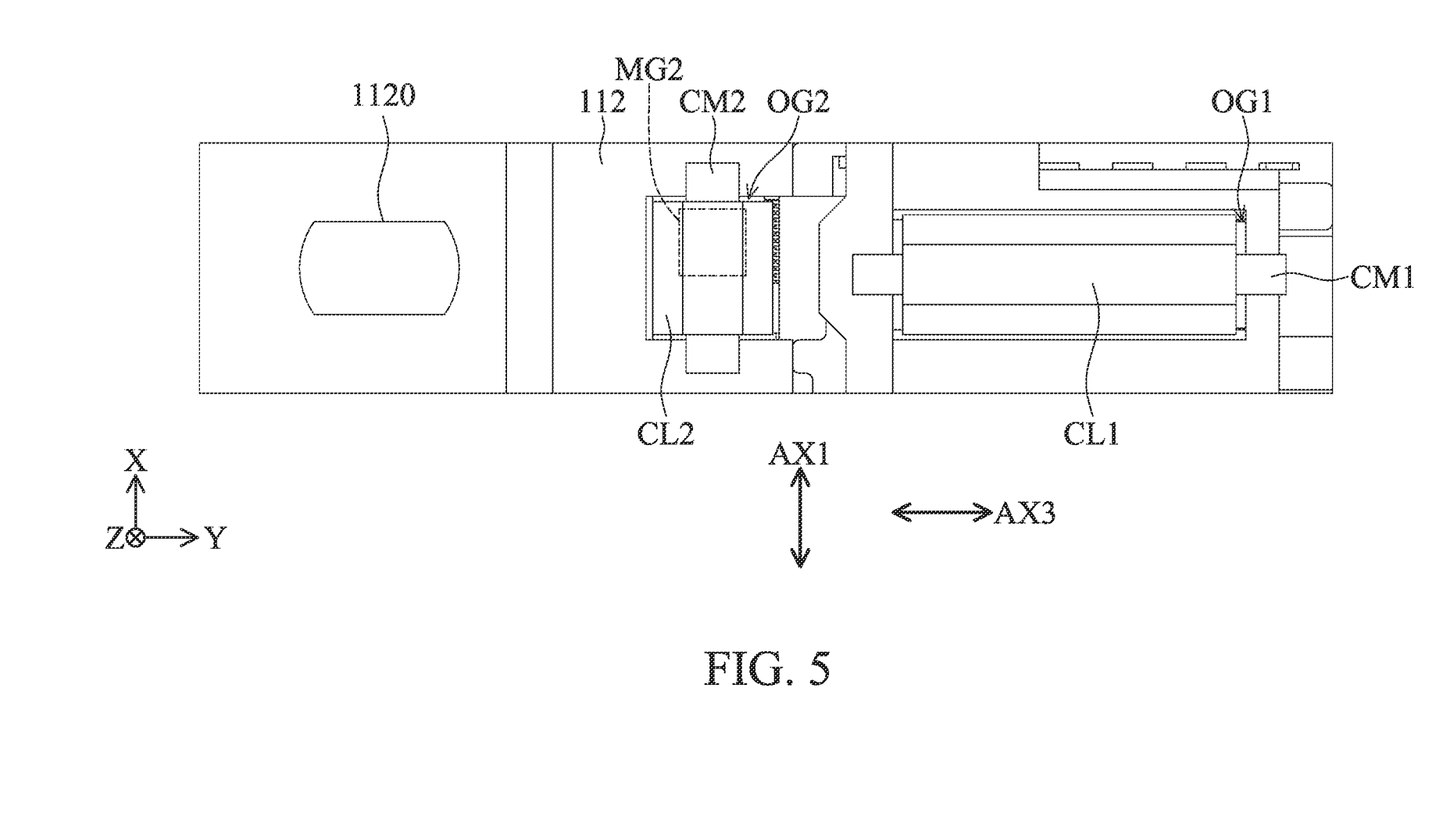
FIG. 5 is a bottom view of a partial structure of the optical element driving mechanism 100 according to an embodiment of the present disclosure.
Figure 6:
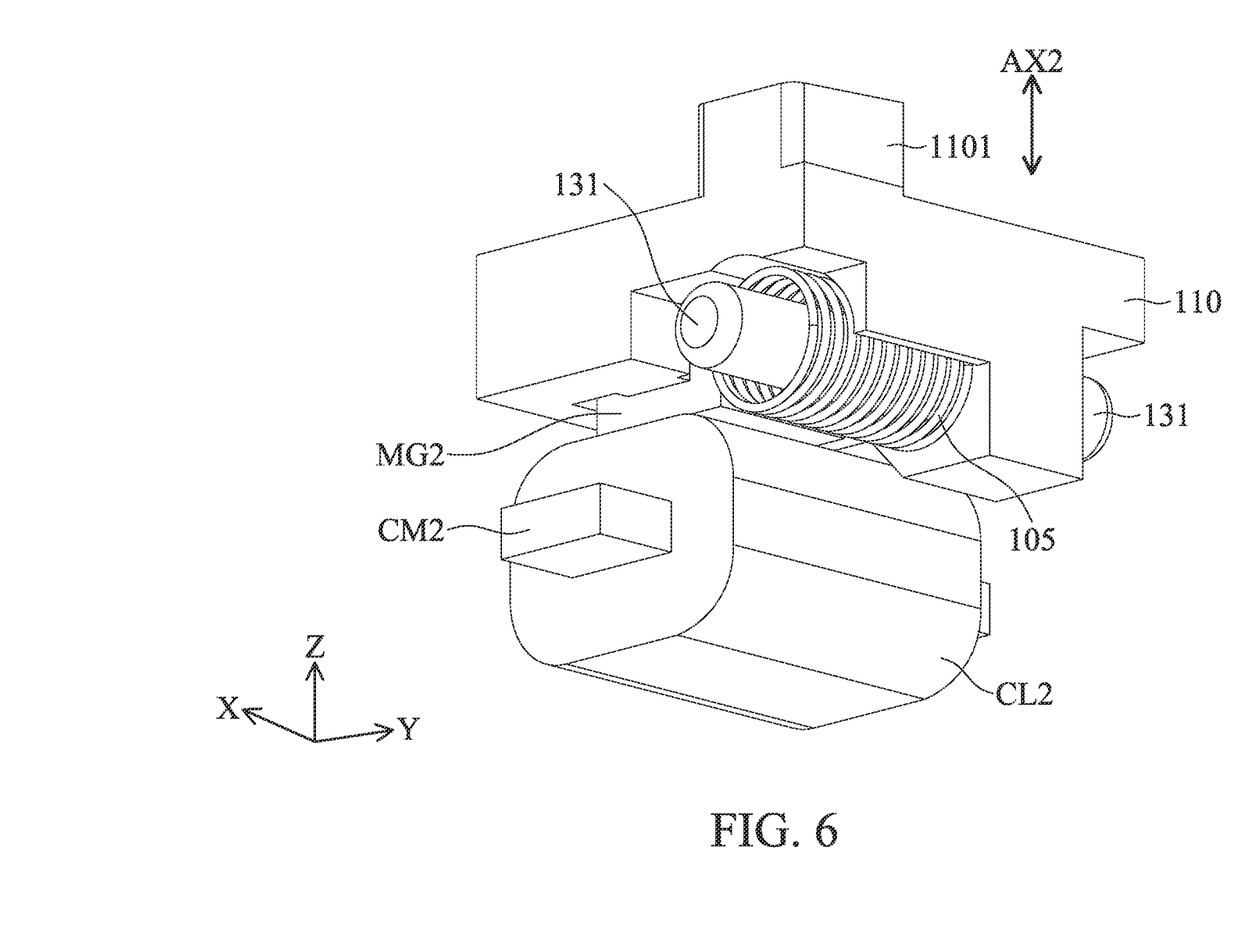
FIG. 6 is a perspective view of a partial structure of the optical element driving mechanism 100 according to an embodiment of the present disclosure.

Please refer to FIG. 2 to FIG. 6. FIG. 4 is a top view of a partial structure of the optical element driving mechanism 100 according to an embodiment of the present disclosure, FIG. 5 is a bottom view of a partial structure of the optical element driving mechanism 100 according to an embodiment of the present disclosure, and FIG. 6 is a perspective view of a partial structure of the optical element driving mechanism 100 according to an embodiment of the present disclosure. The second movable part 110 is movable relative to the fixed assembly FA and the first movable part 108.

The driving module DM may further include a second driving assembly DA2, and the second driving assembly DA2 is configured to drive the second movable part 110 to move relative to the fixed assembly FA. The second driving assembly DA2 can drive the second movable part 110 to move relative to the fixed assembly FA in a first direction D1, and the second driving assembly DA2 can drive the second movable part 110 to move relative to the fixed assembly FA in a second direction D2.

The first direction D1 and the second direction D2 are both parallel to a first axis AX1, and the first direction D1 and the second direction D2 are opposite each other. Furthermore, in this embodiment, the optical element driving mechanism 100 may further include a pressing element 105 configured to generate a first pre-pressure PF1 on the second movable part 110. The pressing element 105 can be, for example, a spring, and the first pre-pressure PF1 can be an elastic force, but it is not limited thereto.

It should be noted that at least one of the first direction D1 and the second direction D2 is the same as the direction of the first pre-pressure PF1. In this embodiment, the first direction D1 is the same as the direction of the first pre-pressure PF1.

The second driving assembly DA2 includes a second coil CL2, a second magnetic element MG2, and a second magnetically conductive element CM2. The second magnetic element MG2 corresponds to the second coil CL2, and the second magnetically conductive element CM2 corresponds to the second coil CL2. For example, the second coil CL2 surrounds the second magnetically conductive element CM2. The second magnetically conductive element CM2 has a plate-shaped structure, the second magnetically conductive element CM2 is perpendicular to the second axis AX2, and the first axis AX1 is perpendicular to the second axis AX2.

The second driving assembly DA2 may further include a guiding element 131 configured to guide the movement of the second movable part 110 relative to the fixed assembly FA, and the guiding element 131 has a long strip-shaped structure extending along the first axis AX1.

In this embodiment, the guiding element 131 is affixed to the base 112, the pressing element 105 surrounds the guiding element 131, the pressing element 105 is in contact with the second movable part 110 and the base 112, and the pressing element 105 is located between the second movable part 110 and the base 112. The pressing element 105 may have a spiral structure, the pressing element 105 may have a metal material, and the pressing element 105 may have flexibility.

As shown in FIG. 4 and FIG. 5, the base 112 of the fixed assembly FA has a second accommodation space AS2 configured to accommodate the second driving assembly DA2. The second accommodation space AS2 has a second slot OG2 extending in a third direction D3. Similarly, the first accommodation space AS1 has a first slot OG1 extending in the third direction D3. The third direction D3 is parallel to the second axis AX2 (the Z-axis).

Based on the above structural design, it is convenient for the operator to install the first magnetically conductive element CM1 and the second magnetically conductive element CM2 into the first slot OG1 and the second slot OG2 from the bottom of the base 112 respectively, and it increases the convenience of assembly and reduces the operating time of the manufacturing process.

As shown in FIG. 4 and FIG. 5, when viewed along the second axis AX2 (the Z-axis), the second magnetically conductive element CM2 having a long strip-shaped structure extends along the first axis AX1. When viewed along the second axis AX2, the first magnetically conductive element CM1 having the long strip-shaped structure extends along a third axis AX3 (the Y-axis).

When viewed along the second axis AX2, the first coil CL1 overlaps at least a part of the first magnetic element MG1. Similarly, as shown in FIG. 5 and FIG. 6, when viewed along the second axis AX2, the second coil CL2 overlaps with at least a part of the second magnetic element MG2.

Figure 7:
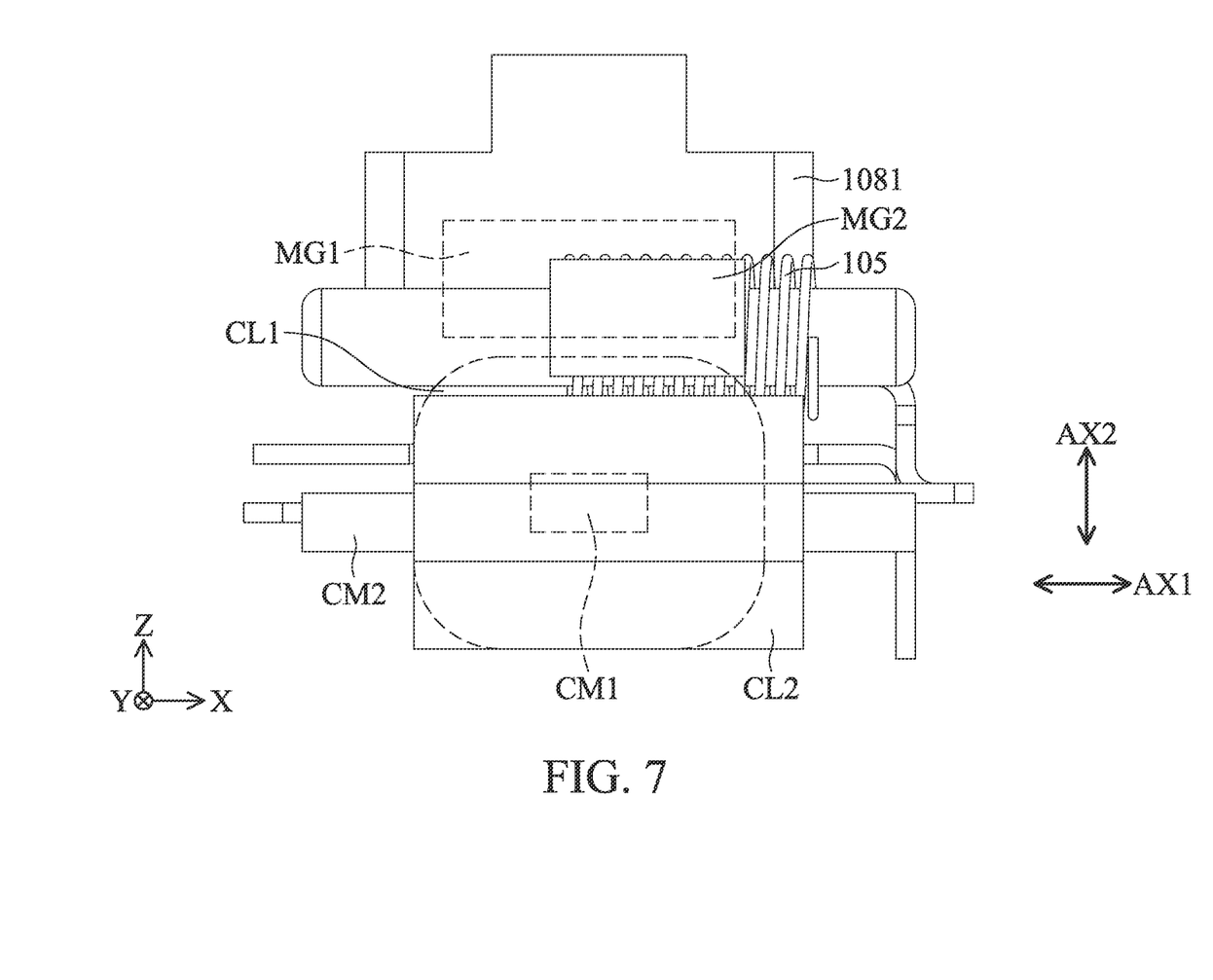
FIG. 7 is a front view of a partial structure of the optical element driving mechanism 100 according to an embodiment of the present disclosure.

Please refer to FIG. 7, which is a front view of a partial structure of the optical element driving mechanism 100 according to an embodiment of the present disclosure. As shown in FIG. 7, when viewed along the third axis AX3, the first coil CL1 overlaps at least a part of the second coil CL2. The third axis AX3 is perpendicular to the first axis AX1 and the second axis AX2.

When viewed along the third axis AX3, the first coil CL1 overlaps at least a part of the second magnetic element MG2. When viewed along the third axis AX3, the first magnetic element MG1 overlaps at least a part of the second magnetic element MG2. When viewed along the third axis AX3, the first magnetic element MG1 and the second coil CL2 do not overlap.

When viewed along the third axis AX3, the first magnetic element MG1 overlaps at least a part of the pressing element 105. When viewed along the third axis AX3, the first coil CL1 overlaps at least a part of the pressing element 105. When viewed along the third axis AX3, the first magnetically conductive element CM1 and the pressing element 105 do not overlap.

When viewed along the third axis AX3, the second magnetic element MG2 overlaps at least a part of the pressing element 105. When viewed along the third axis AX3, the second coil CL2 overlaps at least a part of the pressing element 105. When viewed along the third axis AX3, the second magnetically conductive element CM2 and the pressing element 105 do not overlap.

Figure 8:
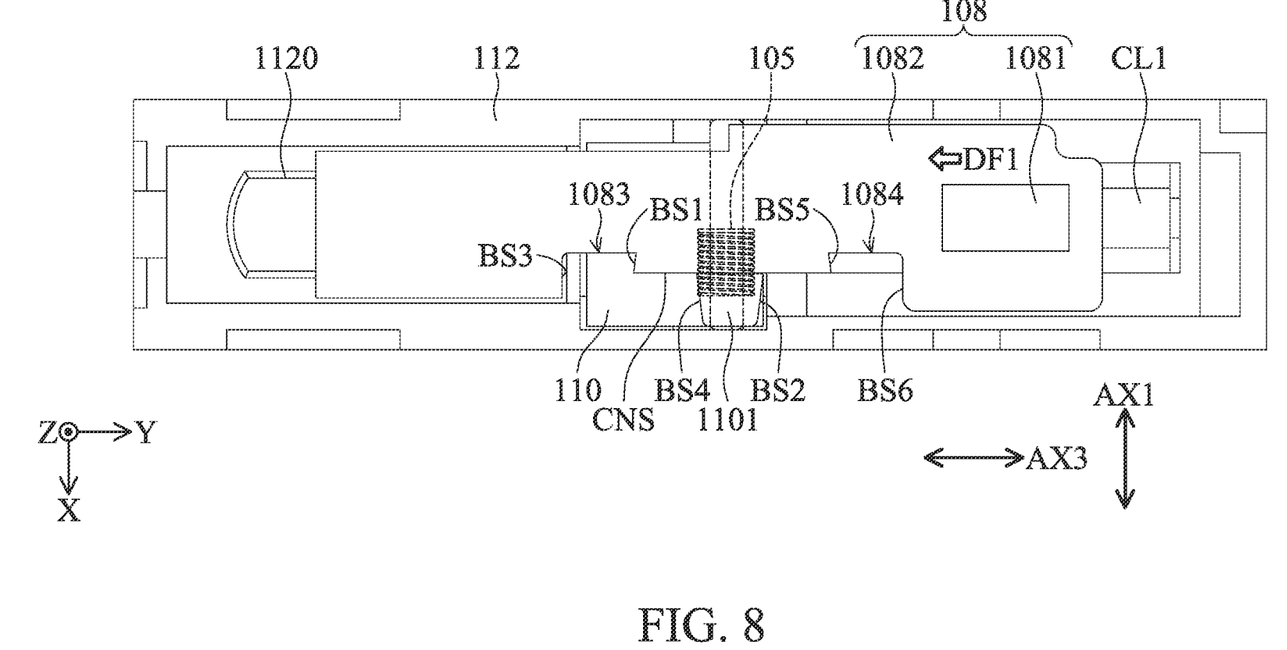
FIG. 8 is a top view illustrating that the first movable part 108 is detached from the locking element 1101 and moves along the third axis AX3 according to an embodiment of the present disclosure.
Figure 9:
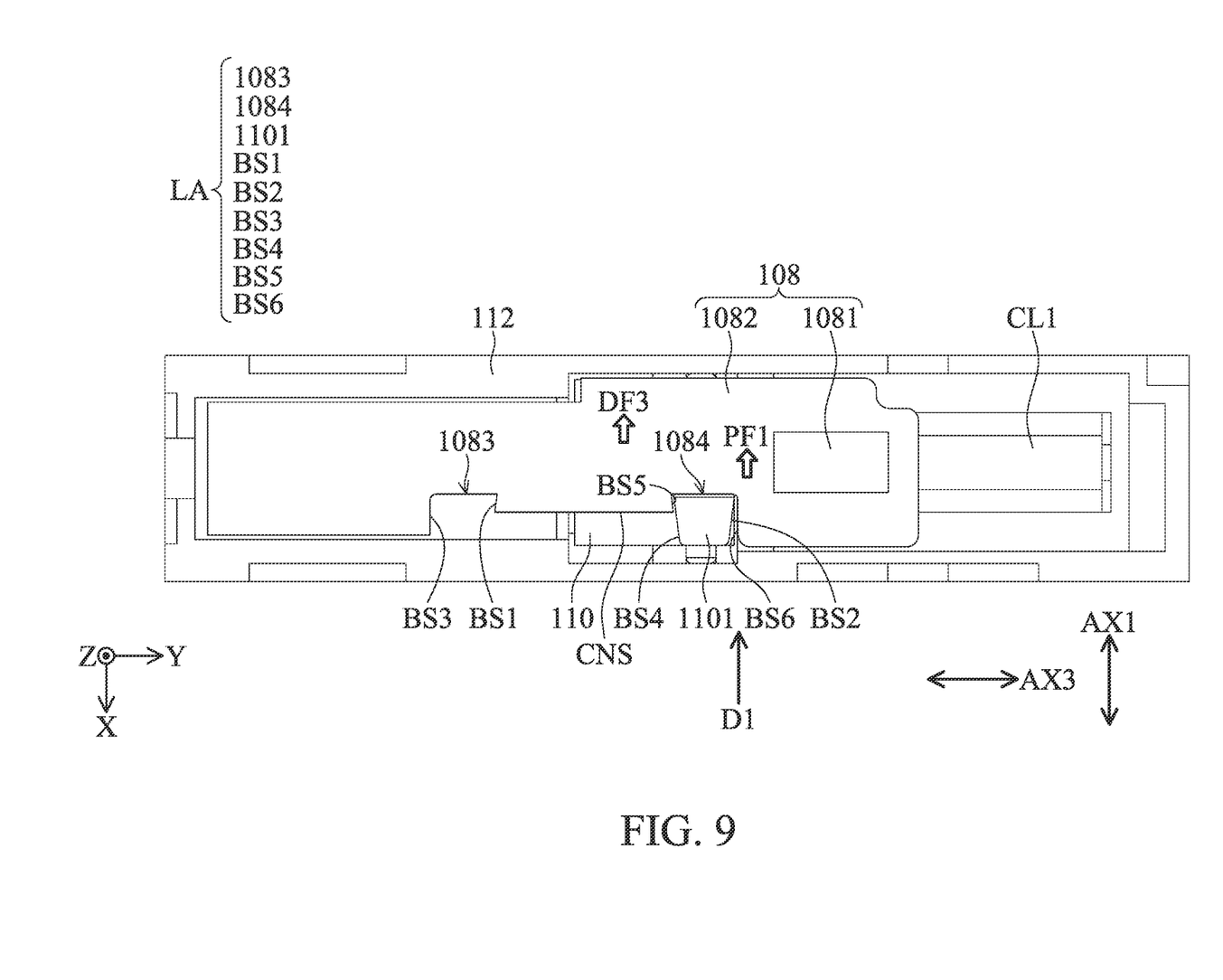
FIG. 9 is a top view illustrating that the first movable part 108 moves to a second position according to an embodiment of the present disclosure.

Please refer to FIG. 2, FIG. 3, FIG. 8 and FIG. 9. FIG. 8 is a top view illustrating that the first movable part 108 is detached from the locking element 1101 and moves along the third axis AX3 according to an embodiment of the present disclosure, and FIG. 9 is a top view illustrating that the first movable part 108 moves to a second position according to an embodiment of the present disclosure. The optical element driving mechanism 100 of the present disclosure can serves as a shutter to adjust the light entering the photosensitive module 150. That is, the locking assembly LA can lock the first movable part 108 at the first position in FIG. 3 or at the second position in FIG. 9.

In this embodiment, the locking assembly LA may include the aforementioned locking element 1101, the first engaging structure 1083, and a second engaging structure 1084. The locking element 1101 is disposed on the second movable part 110, and the locking element 1101 and the second movable part 110 can be integrally formed in one piece. When viewed along the second axis AX2, the locking element 1101 may have a rectangular structure, but it is not limited thereto.

The first engaging structure 1083 and the second engaging structure 1084 are formed on the optical element 1082, and the locking element 1101 can be engaged with the first engaging structure 1083 or the second engaging structure 1084.

In this embodiment, the locking assembly LA may further have a first locking part corresponding to the second movable part 110 and configured to temporarily fix the first movable part 108 at the first position. The first locking part may include a first stopping surface BS1 and a second stopping surface BS2. The first stopping surface BS1 is located on the first engaging structure 1083 of the first movable part 108, and the second stopping surface BS2 is located on the locking element 1101 of the second movable part 110 and corresponds to the first stopping surface BS1.

The first stopping surface BS1 is neither parallel nor perpendicular to the third axis AX3. The second stopping surface BS2 is neither parallel nor perpendicular to the third axis AX3. The first stopping surface BS1 is parallel to the second stopping surface BS2, and the first stopping surface BS1 and the second stopping surface BS2 face opposite directions.

The first stopping surface BS1 and the second stopping surface BS2 are configured to contact each other to limit the movement of the first movable part 108 relative to the fixed assembly FA. It is worth noting that, as shown in FIG. 3, when the first stopping surface BS1 is in contact with the second stopping surface BS2, the two ends of the optical element 1082 of the first movable part 108 with a long strip-shaped structure are not in direct contact with the base 112 of the fixed assembly FA.

Furthermore, the first locking part further includes a third stopping surface BS3 and a fourth stopping surface BS4. The third stopping surface BS3 is located on the first engaging structure 1083 of the first movable part 108, and the fourth stopping surface BS4 is located on the locking element 1101 of the second movable part 110 and corresponds to the third stopping surface BS3.

The fourth stopping surface BS4 is not parallel to the second stopping surface BS2. The fourth stopping surface BS4 is neither parallel nor perpendicular to the third axis AX3. The fourth stopping surface BS4 is not parallel to the third stopping surface BS3. The third stopping surface BS3 and the fourth stopping surface BS4 are configured to contact each other to limit the movement of the first movable part 108 relative to the fixed assembly FA.

It is worth noting that, in the first axis AX1, the maximum size of the first stopping surface BS1 is smaller than the maximum size of the third stopping surface BS3. Similarly, when the third stopping surface BS3 is in contact with the fourth stopping surface BS4, the two ends of the optical element 1082 of the first movable part 108 are not in direct contact with the base 112 of the fixed assembly FA.

When the first opening 1021 and the second opening 1120 need to be closed to prevent the light from entering the photosensitive module 150, the second coil CL2 is provided with electricity to generate a second driving force DF2, so that the locking element 1101 is separated from the first engaging structure 1083 along the second direction D2 to release the optical element 1082. Next, the first coil CL1 and the first magnetic element MG1 generate a first driving force DF1 to drive the first movable part 108 to move along the third axis AX3 to the position in FIG. 8. At this time, the pressing element 105 is pressed, and the locking element 1101 is in contact with a connecting surface CNS of the optical element 1082. After that, the first movable part 108 is driven to the second position in FIG. 9 by the first driving force DF1.

Finally, the electricity provided to the first coil CL1 and the second coil CL2 are stopped, and the first pre-pressure PF1 of the pressing element 105 drives the locking element 1101 to move along the first direction D1 to lock the optical element 1082 at the second position so as to achieve the purpose of closing the first opening 1021 and the second opening 1120. The steps for opening the first opening 1021 and the second opening 1120 are similar to the closing steps, so they are omitted herein.

In addition, in other embodiments, when the first movable part 108 is located at the first position or the second position, the second driving assembly DA2 can generate a third driving force DF3. The direction of the third driving force DF3 is the same as the direction of the first pre-pressure PF1, but the direction of the third driving force DF3 is opposite the direction of the second driving force DF2.

Based on this design, it can be further ensured that the locking element 1101 is firmly engaged with the first engaging structure 1083 or the second engaging structure 1084, so as to prevent the optical element 1082 from being separated from the locking element 1101 when the optical element driving mechanism 100 is impacted.

As shown in FIG. 9, the locking assembly LA may further include a second locking part corresponding to the second movable part 110 and configured to temporarily fix the first movable part 108 at the second position. The second locking part may include a fifth stopping surface BS5 and a sixth stopping surface BS6. The fifth stopping surface BS5 is located on the second engaging structure 1084 of the first movable part 108 and corresponds to the fourth stopping surface BS4, and the sixth stopping surface BS6 is located on the second engaging structure 1084 of the first movable part 108 and corresponds to the second stopping surface BS2.

The fifth stopping surface BS5 is neither parallel nor perpendicular to the third axis AX3. The fifth stopping surface BS5 is parallel to the fourth stopping surface BS4, and the fifth stopping surface BS5 and the fourth stopping surface BS4 face opposite directions.

The fifth stopping surface BS5 and the fourth stopping surface BS4 are configured to contact each other to limit the movement of the first movable part 108 relative to the fixed assembly FA. It is worth noting that, as shown in FIG. 9, when the fifth stopping surface BS5 is in contact with the fourth stopping surface BS4, the two ends of the optical element 1082 of the first movable part 108 with a long strip-shaped structure are not in direct contact with the fixed assembly FA.

Furthermore, the sixth stopping surface BS6 is not parallel to the second stopping surface BS2. The sixth stopping surface BS6 and the second stopping surface BS2 are configured to contact each other to limit the movement of the first movable part 108 relative to the fixed assembly FA.

It is worth noting that, in the first axis AX1, the maximum size of the fifth stopping surface BS5 is smaller than the maximum size of the sixth stopping surface BS6. In the first axis AX1, the maximum size of the fifth stopping surface BS5 is the same as the maximum size of the first stopping surface BS1. In the first axis AX1, the maximum size of the sixth stopping surface BS6 is the same as the maximum size of the third stopping surface BS3.

Similarly, when the sixth stopping surface BS6 is in contact with the second stopping surface BS2, both ends of the optical element 1082 of the first movable part 108 are not in direct contact with the base 112 of the fixed assembly FA. Furthermore, the locking assembly LA may further include a connecting surface CNS located on the first movable part 108 and perpendicular to the first axis AX1. The connecting surface CNS is connected to the first stopping surface BS1 and the fifth stopping surface BS5.

Figure 10:
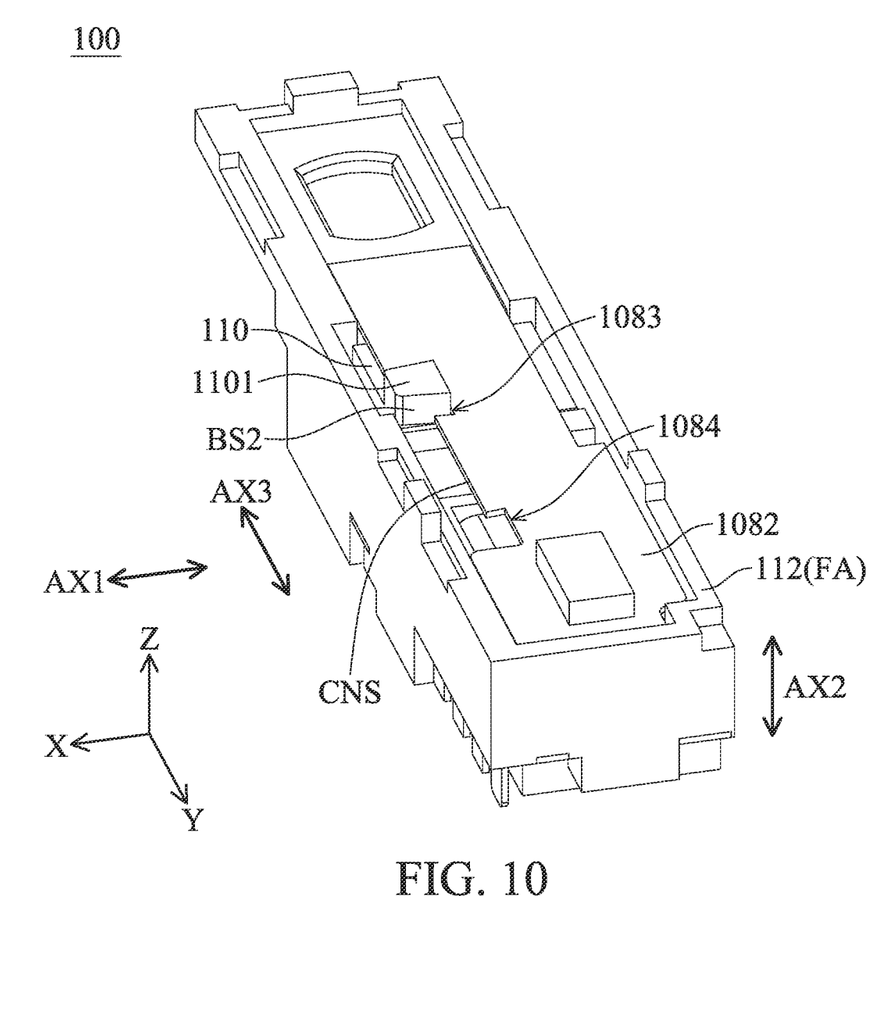
FIG. 10 is a perspective diagram of the optical element driving mechanism 100 in another view according to an embodiment of the present disclosure.

Please refer to FIG. 10, which is a perspective diagram of the optical element driving mechanism 100 in another view according to an embodiment of the present disclosure. As shown in FIG. 10, when the second movable part 110 is at the first position relative to the fixed assembly FA and when viewed along the third axis AX3, the connecting surface CNS overlaps at least a part of the locking element 1101 of the second movable part 110.

Furthermore, when the second movable part 110 is located at the first position relative to the fixed assembly FA and when viewed along the third axis AX3, the connecting surface CNS overlaps at least a part of the second stopping surface BS2.

Figure 11:
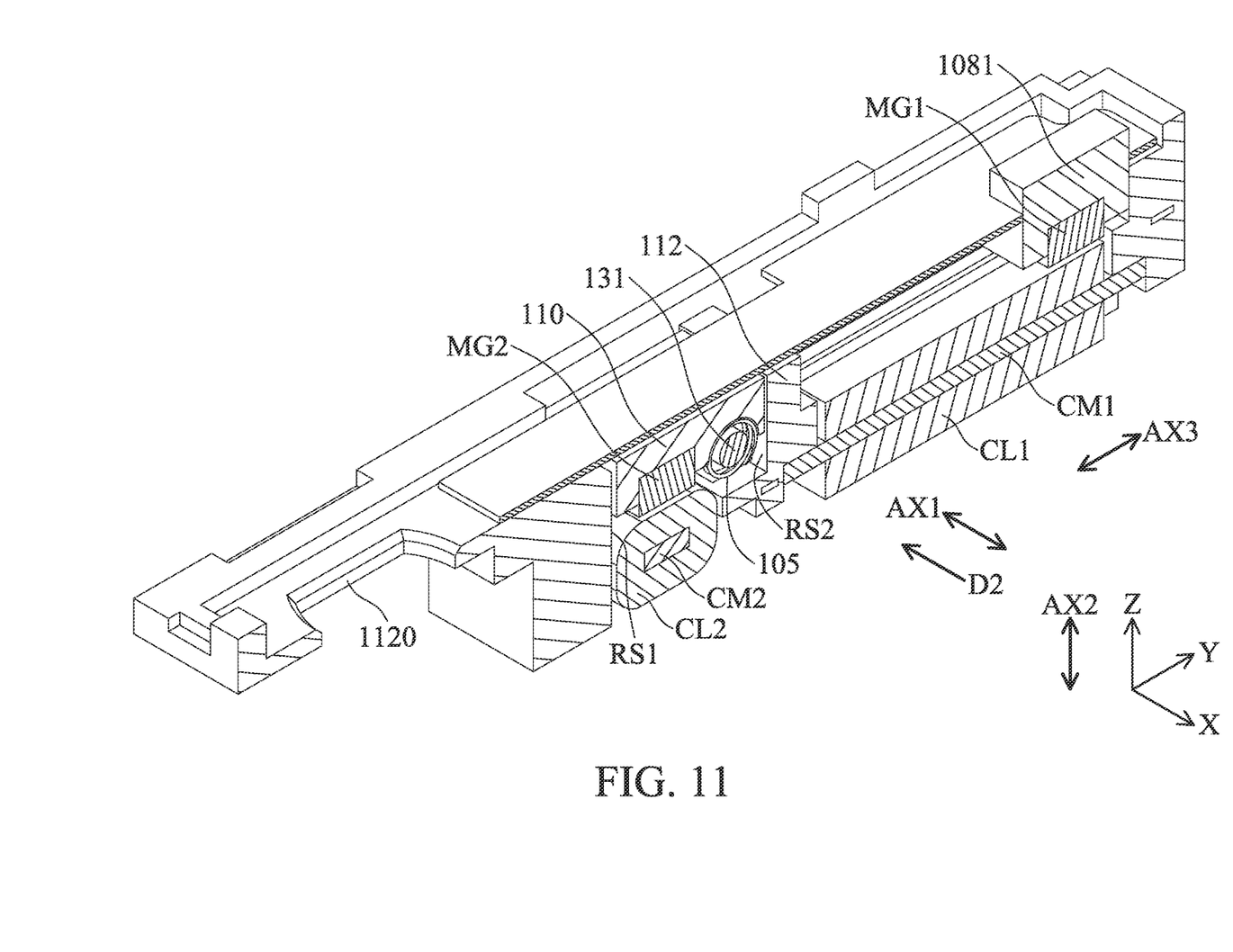
FIG. 11 is a cross-sectional view of the optical element driving mechanism 100 along the line A-A in FIG. 1 according to an embodiment of the present disclosure.

Next, please refer to FIG. 11, which is a cross-sectional view of the optical element driving mechanism 100 along the line A-A in FIG. 1 according to an embodiment of the present disclosure. The optical element driving mechanism 100 may further include a restricting assembly configured to restrict the second movable part 110 from rotating around the first axis AX1 (the X-axis) relative to the base 112 of the fixed assembly FA.

As shown in FIG. 11, the restricting assembly may include a first limiting surface RS1 and a second limiting surface RS2, which are located on the fixed assembly FA and face opposite directions. As shown in FIG. 11, when viewed in the second direction D2, the first limiting surface RS1 and the second limiting surface RS2 are respectively located on both sides of the second movable part 110. The first limiting surface RS1 and the second limiting surface RS2 are both perpendicular to the third axis AX3.

The present disclosure provides an optical element driving mechanism, including a first movable part, a fixed assembly, a first driving assembly and a locking assembly. The first movable part is movable relative to the fixed assembly. The first driving assembly is configured to drive the first movable part to move relative to the fixed assembly. The locking assembly is used to fix the first movable part at the first position or the second position relative to the fixed assembly.

In some embodiments, the locking assembly LA includes the locking element 1101 configured to be selectively engaged with the first engaging structure 1083 or the second engaging structure 1084, thereby locking the optical element 1082. Based on this structural design, the optical element 1082 can be firmly locked. When the optical element driving mechanism is impacted, it can effectively prevent the locking element 1101 from separating from the optical element 1082.

In addition, the optical element driving mechanism can be miniaturized by a special space configuration. Furthermore, the fourth stopping surface BS4 on the locking element 1101 and the fifth stopping surface BS5 on the optical element 1082 can be parallel inclined planes to form an interlocking structure. Based on this special configuration, it can be ensured that when the optical element driving mechanism receives a strong impact, the first opening 1021 can continue to be shaded.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a first movable part, including an optical element;
a fixed assembly, having a first opening, wherein the first movable part is movable relative to the fixed assembly;
a first driving assembly, configured to drive the first movable part to move relative to the fixed assembly, so that the optical element selectively overlaps the first opening; and a locking assembly, configured to fix the first movable part at a first position relative to the fixed assembly temporarily;

wherein the optical element driving mechanism further includes:

a second movable part, movable relative to the fixed assembly and the first movable part; and a second driving assembly, configured to drive the second movable part to move relative to the fixed assembly;

wherein the second driving assembly is configured to drive the second movable part to move along a first axis relative to the fixed assembly;

wherein the fixed assembly defines a second axis;

wherein the first driving assembly is configured to drive the first movable part to move along a third axis;

the third axis is perpendicular to the first axis and the second axis wherein the first driving assembly includes:
a first coil; and
a first magnetic element, corresponding to the first coil;

wherein the second driving assembly includes:
a second coil;
a second magnetic element, corresponding to the second coil; and
a guiding element, configured to guide movement of the second movable part relative to the fixed assembly.

2. The optical element driving mechanism as claimed in claim 1, wherein the optical element driving mechanism further includes a pressing element, configured to generate a first pre-pressure on the second movable part;

wherein the second driving assembly is configured to drive the second movable part to move in a first direction relative to the fixed assembly;

the second driving assembly is configured to drive the second movable part to move in a second direction relative to the fixed assembly;

both the first direction and the second direction are parallel to the first axis;

the first direction and the second direction are opposite each other;

at least one of the first direction and the second direction is the same as a direction of the first pre-pressure.

3. The optical element driving mechanism as claimed in claim 2, wherein the first driving assembly further includes:

a first magnetically conductive element, corresponding to the first coil;

wherein the second driving assembly further includes:

a second magnetically conductive element, corresponding to the second coil; and wherein the guiding element having a long strip-shaped structure extends along the first axis;

the second magnetically conductive element has a plate-shaped structure;

the second magnetically conductive element is perpendicular to a second axis.

4. The optical element driving mechanism as claimed in claim 3, wherein the fixed assembly has a first accommodation space configured to accommodate the first driving assembly;

the first accommodation space has a first slot extending in a third direction;

wherein the fixed assembly has a second accommodation space configured to accommodate the second driving assembly;

the second accommodation space has a second slot extending in the third direction;

when viewed along the second axis, the second magnetically conductive element with a long strip-shaped structure extends along the first axis;

the second coil surrounds the second magnetically conductive element.

5. The optical element driving mechanism as claimed in claim 4, wherein when viewed along the second axis, the second coil overlaps at least a part of the second magnetic element;

when viewed along the third axis, the second magnetic element overlaps at least a part of the pressing element.

6. The optical element driving mechanism as claimed in claim 5, wherein when viewed along the third axis, the second coil overlaps at least a part of the pressing element;

when viewed along the third axis, the second magnetically conductive element does not overlap the pressing element;

the pressing element surrounds the guiding element;
the pressing element has a spiral structure;
the pressing element has a metal material;
the pressing element has flexibility.

7. The optical element driving mechanism as claimed in claim 6, wherein the optical element driving mechanism further includes a restricting assembly configured to restrict the second movable part from rotating around the first axis relative to the fixed assembly;

wherein the restricting assembly includes a first limiting surface and a second limiting surface located on the fixed assembly and facing opposite directions.

8. The optical element driving mechanism as claimed in claim 7, wherein when viewed along the second direction, the first limiting surface and the second limiting surface are respectively located on two sides of the second movable part;

wherein both the first limiting surface and the second limiting surface are perpendicular to the third axis.

9. The optical element driving mechanism as claimed in claim 8, wherein the locking assembly further includes:

a first locking part, corresponding to the second movable part and configured to temporarily fix the first movable part at the first position, and the first locking part includes:

a first stopping surface, located on the first movable part; and a second stopping surface, located on the second movable part and corresponding to the first stopping surface;

the first stopping surface is neither parallel nor perpendicular to the third axis;

the second stopping surface is neither parallel nor perpendicular to the third axis.

10. The optical element driving mechanism as claimed in claim 9, wherein the first stopping surface is parallel to the second stopping surface;

the first stopping surface and the second stopping surface face opposite directions;

the first stopping surface and the second stopping surface are configured to contact each other to limit movement of the first movable part relative to the fixed assembly;

when the first stopping surface is in contact with the second stopping surface, two ends of the first movable part with a long strip-shaped structure are not in direct contact with the fixed assembly.

11. The optical element driving mechanism as claimed in claim 10, wherein the first locking part further includes:

a third stopping surface, located on the first movable part; and a fourth stopping surface, located on the second movable part and corresponding to the third stopping surface;

wherein the fourth stopping surface is not parallel to the second stopping surface;

the fourth stopping surface is neither parallel nor perpendicular to the third axis;

the fourth stopping surface is not parallel to the third stopping surface.

12. The optical element driving mechanism as claimed in claim 11, wherein the third stopping surface and the fourth stopping surface are configured to contact each other to limit the movement of the first movable part relative to the fixed assembly;

in the first axis, a maximum size of the first stopping surface is smaller than a maximum size of the third stopping surface;

when the third stopping surface is in contact with the fourth stopping surface, the two ends of the first movable part are not in direct contact with the fixed assembly.

13. The optical element driving mechanism as claimed in claim 12, wherein the locking assembly further includes:

a second locking part, corresponding to the second movable part and configured to temporarily fix the first movable part at a second position, and the second locking part includes:

a fifth stopping surface, located on the first movable part and corresponding to the fourth stopping surface; and a sixth stopping surface, located on the first movable part;

wherein the fifth stopping surface is neither parallel nor perpendicular to the third axis.

14. The optical element driving mechanism as claimed in claim 13, wherein the fifth stopping surface is parallel to the fourth stopping surface;

the fifth stopping surface and the fourth stopping surface face opposite directions;

the fifth stopping surface and the fourth stopping surface are configured to contact each other to limit the movement of the first movable part relative to the fixed assembly;

when the fifth stopping surface is in contact with the fourth stopping surface, the two ends of the first movable part with the long strip-shaped structure are not in direct contact with the fixed assembly.

15. The optical element driving mechanism as claimed in claim 14, wherein the sixth stopping surface is not parallel to the second stopping surface;

the sixth stopping surface and the second stopping surface are configured to contact each other to limit the movement of the first movable part relative to the fixed assembly;

in the first axis, a maximum size of the fifth stopping surface is smaller than a maximum size of the sixth stopping surface;

in the first axis, the maximum size of the fifth stopping surface is the same as the maximum size of the first stopping surface;

in the first axis, a maximum size of the sixth stopping surface is the same as the maximum size of the third stopping surface.

16. The optical element driving mechanism as claimed in claim 15, wherein when the sixth stopping surface is in contact with the second stopping surface, the two ends of the first movable part are not in direct contact with the fixed assembly;

the locking assembly further includes a connecting surface, located on the first movable part and perpendicular to the first axis;

the connecting surface is connected to the first stopping surface and the fifth stopping surface.

17. The optical element driving mechanism as claimed in claim 16, wherein when the second movable part is located at the first position relative to the fixed assembly, and when viewed along the third axis, the connecting surface overlaps at least a part of the second movable part;

when the second movable part is located at the first position relative to the fixed assembly, and when viewed along the third axis, the connecting surface overlaps at least a part of the second stopping surface.

18. The optical element driving mechanism as claimed in claim 6, wherein the first magnetically conductive element has a plate-shaped structure;

the first coil surrounds the first magnetically conductive element;

the first magnetically conductive element is perpendicular to a second axis.

19. The optical element driving mechanism as claimed in claim 18, wherein the fixed assembly further has a guiding structure configured to guide the movement of the first movable part relative to the fixed assembly;

when viewed along the second axis, the first magnetically conductive element with a long strip-shaped structure extends along the third axis;

when viewed along the second axis, the first coil overlaps at least a part of the first magnetic element.

20. The optical element driving mechanism as claimed in claim 19, wherein when viewed along the third axis, the first coil overlaps at least a part of the second coil;

when viewed along the third axis, the first coil overlaps at least a part of the second magnetic element;

when viewed along the third axis, the first magnetic element overlaps at least a part of the second magnetic element;

when viewed along the third axis, the first magnetic element and the second coil do not overlap;

when viewed along the third axis, the first magnetic element overlaps at least a part of the pressing element;

when viewed along the third axis, the first coil overlaps at least a part of the pressing element;

when viewed along the third axis, the first magnetically conductive element does not overlap with the pressing element.

* * * * *